US009276640B2

(12) United States Patent
Brabenac

(10) Patent No.: US 9,276,640 B2
(45) Date of Patent: Mar. 1, 2016

(54) NEAR FIELD COMMUNICATIONS-TRIGGERING FOR WIRELESS DISPLAY/DOCKING

(75) Inventor: Charles L. Brabenac, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 13/976,083

(22) PCT Filed: Dec. 21, 2011

(86) PCT No.: PCT/US2011/066352
§ 371 (c)(1),
(2), (4) Date: Sep. 30, 2013

(87) PCT Pub. No.: WO2013/095409
PCT Pub. Date: Jun. 27, 2013

(65) Prior Publication Data
US 2014/0017999 A1    Jan. 16, 2014

(51) Int. Cl.
*H04B 5/00* (2006.01)
*G06F 13/14* (2006.01)
*H04W 4/00* (2009.01)
*H04W 4/02* (2009.01)

(52) U.S. Cl.
CPC ............. *H04B 5/0012* (2013.01); *G06F 13/14* (2013.01); *H04W 4/008* (2013.01); *H04W 4/023* (2013.01); *H04B 5/0081* (2013.01)

(58) Field of Classification Search
USPC .............. 455/423, 424, 425, 41.1, 41.2, 41.3, 455/550.1, 566, 575.1
See application file for complete search history.

(56) References Cited

U.S. PATENT DOCUMENTS

| 2008/0004002 | A1* | 1/2008 | Chin et al. ..................... 455/425 |
| 2008/0195788 | A1 | 8/2008 | Tamir et al. |
| 2009/0170431 | A1* | 7/2009 | Pering et al. ................. 455/41.1 |
| 2010/0057969 | A1 | 3/2010 | Meiri et al. |
| 2011/0273475 | A1 | 11/2011 | Herz et al. |

FOREIGN PATENT DOCUMENTS

| KR | 2007-0018294 A | 2/2007 |
| WO | 2007/146177 A2 | 12/2007 |
| WO | 2008/112497 A1 | 9/2008 |
| WO | 2010/110961 A2 | 9/2010 |
| WO | 2013/095409 A1 | 6/2013 |

OTHER PUBLICATIONS

International Preliminary Report on Patentability and Written Opinion received for PCT Patent Application No. PCT/US2011/066352, mailed on Jul. 3, 2014, 8 pages.
International Search Report and Written Opinion Received for PCT Patent Application No. PCT/US2011/065504, Mailed on Aug. 24, 2012, 12 pages.
Extended European Search report received for European Patent Application No. 11878156.6, mailed on Jul. 1, 2015, 7 pages.

* cited by examiner

*Primary Examiner* — Thanh Le
(74) *Attorney, Agent, or Firm* — Forefront IP Lawgroup, PLLC

(57) ABSTRACT

Described herein are techniques related to devices with wireless docking capabilities and more particularly near field communications-based techniques for docking and undocking devices. This Abstract is submitted with the understanding that it will not be used to interpret or limit the scope or meaning of the claims.

30 Claims, 4 Drawing Sheets

NEAR FIELD COMMUNICATIONS-TRIGGERING FOR WIRELESS DISPLAY/DOCKING

BACKGROUND

Docking stations often have one or more persistent clients docked thereto. When the docking station operates wirelessly, as is increasingly the case, undocking and/or evicting an incumbent client and connecting another client involves many cumbersome steps often involving access to and use of the user interfaces (UIs) of the clients. For instance, some steps must occur on one client UI and other steps must occur on the other client's UI. The process often confuses the user leading to user frustration and failed docking attempts. Moreover, the UI of one or more of the clients (often the incumbent client) might not be readily accessible to the user who wishes to dock a client to the docking station.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are techniques for docking and undocking clients in user-friendly manners using wireless docking technologies, such as near field communications-related protocols.

More specifically, embodiments provide docking stations (and related clients and support devices) which dock and undock with near field communications defined bumps (i.e., taps) between docking stations and clients and/or support devices. For instance, in some embodiments, a bump of a client (or support device) with a docking station causes the docking station to associate an interface with the client (or support device) and causes the docking station to establish communications between the client (or support device) and supporting devices (or clients).

Near Field Communication (NFC) is a standards-based connectivity technology that establishes wireless connection between two devices in close proximity of each other (e.g., within 4 centimeters and theoretically up to 20 centimeters). NFC allows users to transfer information by touching, or tapping, one device with another device. The act of bringing one NFC-enabled device to close proximity of another NFC-enabled device with or without the two devices physically contacting each other, referred to as "NFC bump," "NFC tap" hereinafter. It may also be more generally called "bumping" or "tapping."

Figure 1:
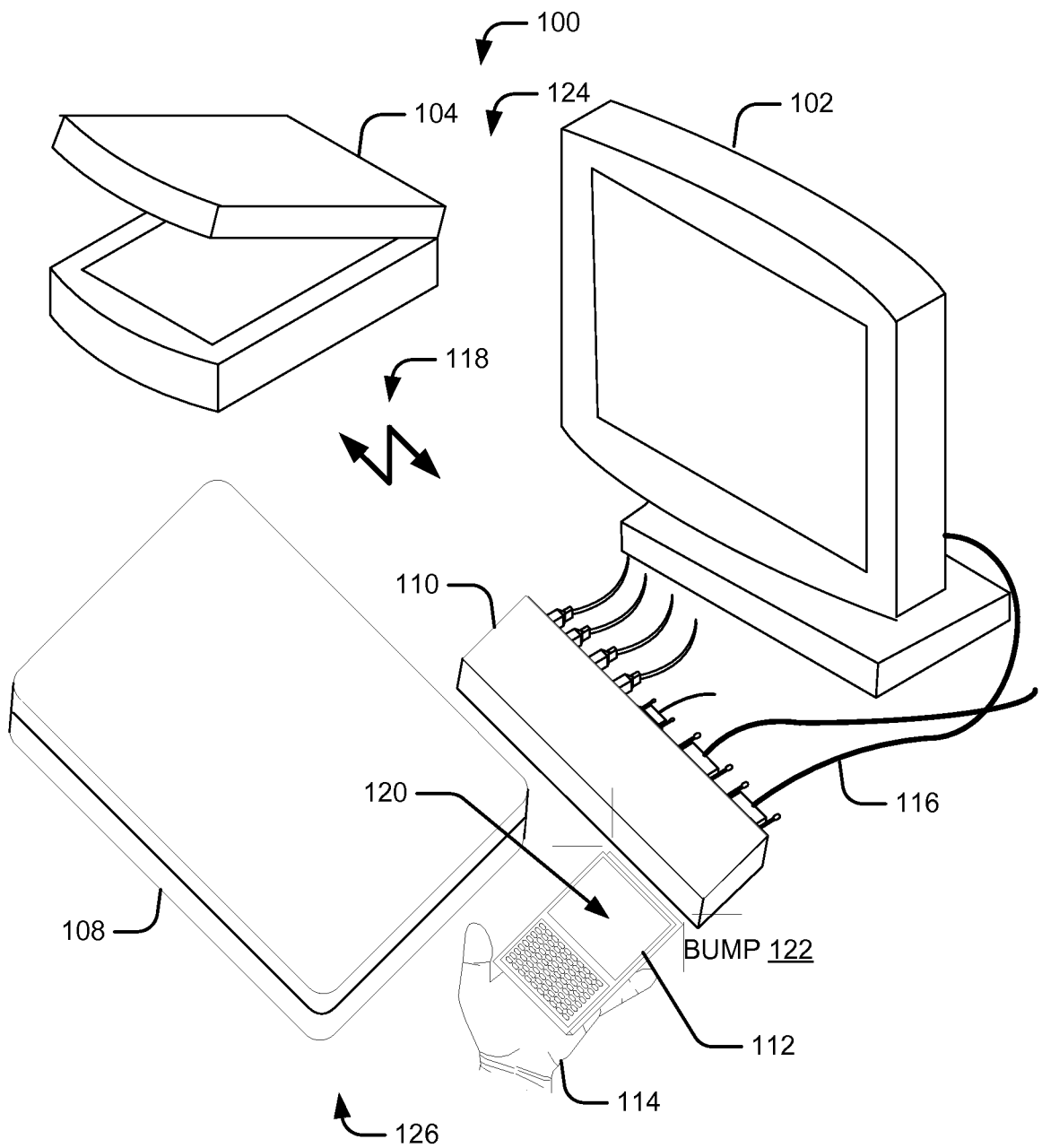
FIG. 1 is a perspective view illustrating an example system implementing a docking station.

FIG. 1 is a perspective view illustrating an example system implementing a docking station. More specifically, FIG. 1 illustrates system 100, display 102, scanner 104, laptop computer 108, docking station 110, cellular telephone 112, user 114, cables 116, wireless signal(s) 118, user interface 120 of the cellular telephone 112, and bump 122. Often, users 114 have attached various support devices 124 (such as the display 102, the scanner 104, printers, etc.) to docking stations 110 via cables 116 so that the docking station 110 serves to connect various mobile devices 126 (such as laptop computer 108, cellular telephone 112, etc.) to those support devices 124. Of course, in some instances, some or all of the various support devices 124 may be wirelessly connected to the docking stations 110.

Indeed, many conventional docking stations 110 have a set of connectors on one of their sides for the cables 116 and have another set of connectors on another of their sides, which mate with corresponding connectors on the mobile devices 126. Thus, the docking station 110 allows users to connect the mobile devices 126 to the support devices 124. Of course, some support devices may be wirelessly connected to the docking stations 110 as well. In some instances, the various devices connected to the docking station can sometimes be more or less permanent (that is, they are not necessarily mobile) and might therefore have a status with respect to the docking station 110 that can be describe as one of "incumbency."

However, with the increasing availability of docking stations 110 and mobile devices 126 with wireless docking capabilities, several challenges have become apparent with such schemes. For one thing, users 114 must manually (re)configure the conventional docking station 110 to associate an interface with each mobile device 126. In addition, in conventional scenarios, users 114 must configure the mobile devices 126 themselves and sometimes they might also have to configure the support devices 124 as mobile devices are added or removed from the system 100. These conventional configuration activities often involve multiple steps involving the displays 102 and/or other input/output devices of the docking station 110 (if it has one), the mobile devices 126, and the support devices 124.

Moreover, if one device (for instance, the laptop computer 108) resides on the conventional docking station for relatively long periods, it can cause one of the interfaces of the docking station 110 to become dedicated to that particular device, at least in a de facto sense. Such incumbent devices (or clients) therefore restrict the ability of users 114 to access and use the capabilities of conventional docking stations 110. Additionally, some mobile devices (such as laptop computer 108) might be in a condition not conducive to assisting with the conventional reconfiguration of the docking station 110 and/or other aspects of system 100 when a user 114 wants to alter the mixture of mobile devices 126 docked to conventional docking stations 110. For instance, a laptop computer 108 might be sleeping, hibernating, off, or in some other state requiring a relatively lengthy awakening, re-activation, re-booting, etc. Thus, a need has arisen for more convenient, user-friendly docking stations and associated systems, techniques, etc.

In part to alleviate the foregoing concerns, and/or for other reasons, embodiments provide docking stations 110 that provide for docking mobile devices 126 using near field communications-related techniques. For instance, embodiments allow users 114 to "bump" or "tap" 122 mobile devices 126 with docking stations 110 to trigger a docking therewith. In addition, docking stations 110 of embodiments automatically associate a client interface with mobile devices 126, which dock in such manners. Moreover, docking stations 110 provided herein can also switch the support devices 124 from communicating with an incumbent device to communicating with the newly docked device responsive to such wireless techniques.

Exemplary Devices

Figure 2:
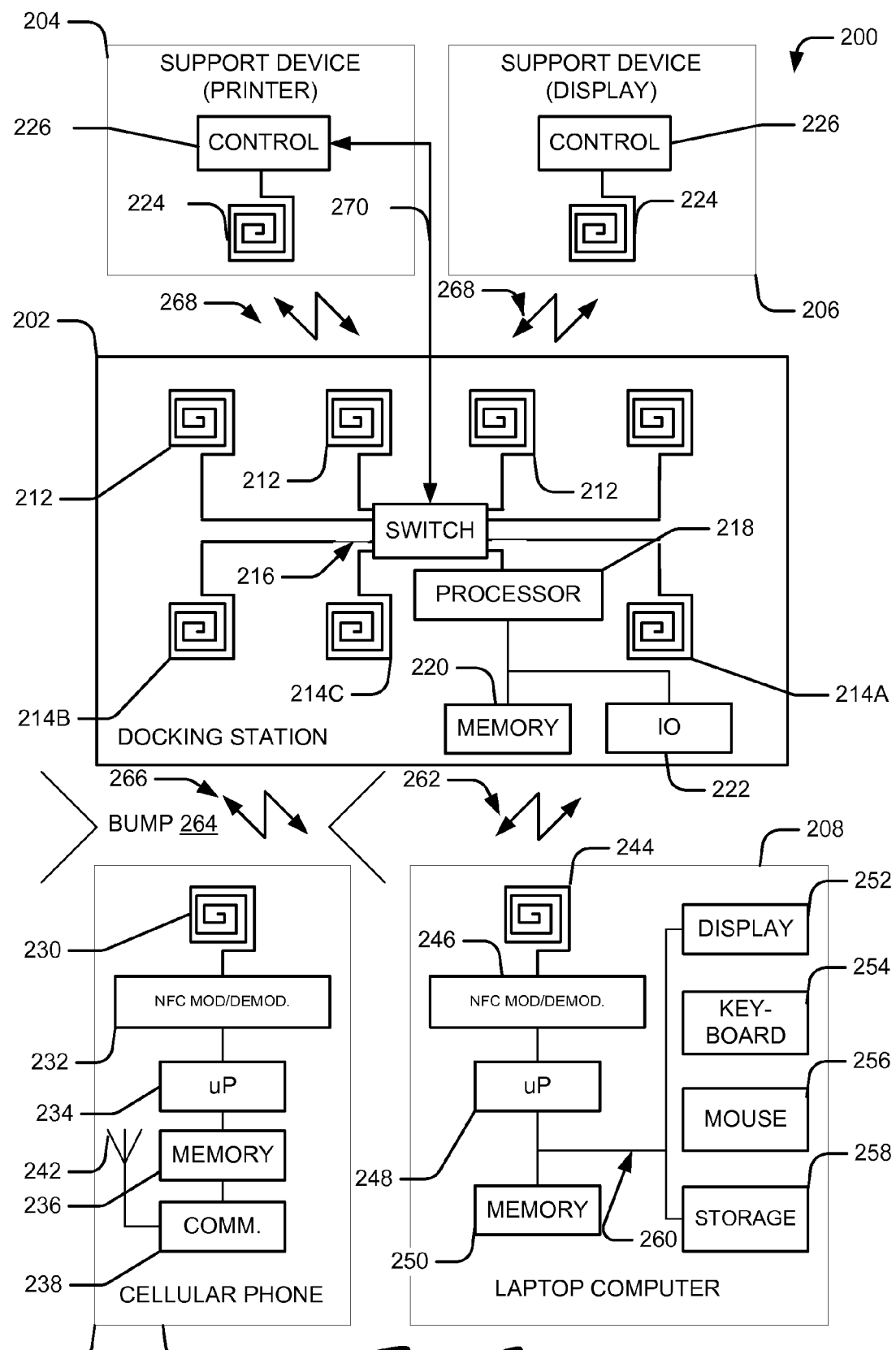
FIG. 2 is a block diagram illustrating an example docking station, clients, and support devices.

FIG. 2 is a block diagram illustrating an example system, docking station, clients, and support devices. More specifically, FIG. 2 illustrates that system 200 includes a wireless docking station 202, a printer 204, a display 206, a laptop computer 208, and a cellular telephone 210 among other potential clients and support devices. System 200 may be configured in a variety of manners. However, for illustrative purposes it might be beneficial to assume that for the current embodiment the laptop computer 208 is an incumbent client of docking station 202 and that a user wishes to dock the cellular telephone 210 to the docking station 202 as a new client. Moreover, it can be assumed for similar illustrative purposes that all client interfaces of the docking station 202 have other incumbent devices associated therewith or that they are otherwise unavailable. Moreover, in the current embodiment, the printer 204, the display 206, and other support devices similarly occupy all available support interfaces.

With continuing reference to FIG. 2, the docking station 202 of the current embodiment includes a plurality of support interfaces 212, a plurality of client interfaces 214, an interface switch 216, one or more processors 218 (or other controllers), a memory 220, and input/output (IO) system 222 or some provision to access machine or storage system (i.e., some type of computer-readable media). The interface switch 216 is operatively coupled to the support and client interfaces 212 and 214 and is controlled by the processor 218. The processor 218 reads machine executable instructions and reads data from and writes data to memory 220 and/or other computer readable media. Indeed, either the memory 220, the computer readable media, or both store instructions for operating the docking station 202. Thus, as is disclosed further herein, responsive to certain circumstances, the interface switch 216 connects one or more support interfaces 212 to one or more client interfaces 214.

FIG. 2 illustrates the support and client interfaces 212 and 214 as including, or being, NFC compatible antennas. However, other types of interfaces are within the scope of the current disclosure. For instance, other radio frequency (RF) antenna types (e.g., Bluetooth™, WiFi™, and the like) could be employed and/or virtual interfaces, which share the use of certain hardware components, are also within the scope of the disclosure.

With regard to the support devices, each support device 204 and 206 has therein a support antenna 224 for transmitting/receiving (transceiving) wireless signals with other wireless devices and specifically with the docking station 202. FIG. 2 also illustrates that the support devices 204 and 206 further include controllers 226 for controlling the transceiving of those signals as well as for executing certain operations involving information encoded in those wireless signals (for instance, printing, displaying, etc. that information). Again, the support antennas 224 represent interfaces and can be physical devices and/or virtual interfaces as might be desired.

As with the support devices 204 and 206, the cellular telephone 210 also includes a number of components. For instance, the cellular telephone 210 also includes an NFC antenna 230, an NFC circuit 232, microprocessors 234 or other processors or controllers, a memory 236, and communication circuits 238 in a housing 240. Additionally, the cellular telephone includes a cellular antenna 242. Again, the NFC antenna 230 serves to transcieve wireless signals while the NFC circuit 232 serves to modulate, condition, encode, decode, etc. those signals prior to their transmission and/or after their reception. The communication circuits 238 and cellular antenna 242 allow the cellular telephone 210 to transcieve wireless signals conveying digital and/or analog data over a telephony network (not shown). The processor 234 serves to control most if not all of these functions at some level. Moreover, cellular telephone 210 serves to exemplify many of the types of mobile devices and other clients that can dock to docking stations 202 of the current embodiment.

The incumbent laptop computer 208 of the current embodiment is shown as being somewhat more complex than the other devices in system 200. In some ways similar to the other previously addressed devices in system 200, the incumbent laptop computer 208 includes an NFC antenna 244, an NFC circuit 246, a processor 248, and a memory 250. While the foregoing components perform some or all of the functions of similar components in the cellular telephone 210 and support devices 204 and 206, these components might be more powerful and or more capable than their corresponding components in the other devices.

Indeed, the incumbent laptop computer 208 also includes a display 252, a keyboard 254, a mouse 256 or other pointing device, a storage system (e.g., hard drive) 258, and a bus 260 (linking its components together) among many other potential components. While the incumbent laptop computer 208 provides much greater functionality (at least in some respects) than the support devices 204 and 206 and the cellular telephone 210 this enhanced functionality carries with it some comparative disadvantages. For instance, typical laptop computers 208 are usually heavier and bulkier than typical cellular telephones 210. Moreover, cellular telephones 210 tend to be much quicker to re-awaken, reactivate, re-boot, etc. than typical laptop computers 208. Thus, users tend to carry cellular telephones 210 (and other lightweight, small form factor, and/or thin mobile devices) with them more often than laptop computers 208. Moreover, given the functionality built into many such small mobile devices, users often desire to connect them quickly and conveniently to support devices 204 and 206 rather than relying on the (albeit more powerful, but less readily accessible) laptop computers 208.

Thus, embodiments allow users to dock mobile devices such as cellular telephones 210 to docking stations with near field communications protocols (such as "bumping" the devices) and/or other wireless protocols. As FIG. 2 illustrates, the incumbent laptop computer 208 is occupying a client interface 214A via a, perhaps, ongoing exchange of wireless signals 262 between its NFC antenna 244 and client interface 214A. As such, client interface 214A is unavailable for use by other wireless devices and, more specifically, the cellular telephone 210 which a user might wish to dock with the docking station 202. Moreover, it is likely that the interface switch 216 has previously connected the client interface 214A (occupied by the incumbent laptop computer 208 client) with one or more of the support interfaces 212 (and hence, one or more support devices 204 and 206). Accordingly, even if a new device were to dock with the docking station 202, the support devices 204 and/or 206 operatively connected with the support interfaces 212 of the docking station 202 might be unavailable to that newly docked device in conventional systems. This might be the case, moreover, even if the incumbent laptop computer 208 were inactive or otherwise not using these support devices 204 and/or 206.

However, docking station 202 of the current embodiment provides the capabilities of the support devices 204 and 206 to soon-to-be-docked clients as is disclosed further herein. Indeed, in accordance with the current embodiment, when the non-incumbent device (here cellular telephone 210) executes an NFC bump 264 with the docking station 202, one (or more) of the client interfaces 214 senses the bump. Responsive thereto, interface switch 216 switches the connectivity of the support interfaces 212 and client interfaces 214 to support the newly added client (that is, here, the cellular telephone 210).

More specifically, the docking station 202 associates one of the client interfaces 214 with the newly added cellular telephone 210, establishes communications therewith through that client interface 214 (or otherwise), and also operatively connects the support interfaces 212 associated with the support devices 204 and 206 to the newly added client via its associated client interface 214. Thus, the newly added client can access the support devices 204 and 206 using wireless signals 266 via its now associated client interface 214, interface switch 216, and the appropriate support interfaces 212.

In the meantime, the docking station 202 of the current embodiment can maintain the association of the incumbent client with its associated client interface 214A. Or, if that client interface 214A happens to be needed or wanted to support the newly added client, its association can be switched to the newly added client (such as cellular telephone 210).

At some time, the user might wish to reverse the switch between supporting the newly added client and the previously incumbent client. For instance, the user might have accomplished the purpose of placing the cellular telephone 210 in communication with the support devices 204 and 206. Furthermore, the user might also wish to once again place the previously incumbent laptop computer 208 in communication with the support devices 204 and 206 for other purposes. In accordance with embodiments, the user can execute a second or subsequent NFC bump 264 (or initiate another wireless protocol event) between the cellular telephone 210 and the docking station 202. Upon sensing this second bump from the recently added cellular telephone 210 (or other client), interface switch 216 can switch client interface 214A back into communication with the support interfaces 212 serving support devices 204 and 206.

Thus, should the incumbent device (for instance, laptop computer 208) be in use only a temporary interruption of communications with the support devices 204 and 206 might be noticed. Of course, if the same user were using both the incumbent client and the newly added client, no interruption might even be noted. Moreover, because the system 200 can store (and re-use) relevant configuration information for each of the clients (such as cellular telephone 210 and laptop computer 208) support devices 204 and 206, and support and client interfaces 212 and 214 which it has handled previously, no (or little) user effort can go into executing the switch between mobile devices 208 and 210. Moreover, the availability of the support devices 204 and 206 to the newly added client might be so quick as to appear to be instantaneous to many users.

With continuing reference to FIG. 2, it can be the case that one or more of the support devices 204 and 206 might be wirelessly coupled to the docking station 202. Moreover, some of the support devices 204 and 206 might be connected to the docking station by conventional cables 270. Thus, FIG. 2 illustrates the printer 204 being connected to the docking station via the cable 270. However, even for those support devices 204 and/or 206 with cabled interfaces to the docking station 202, the interface switch 216 can be operatively coupled thereto such that it can switch that cabled interface to/from the various client interfaces 214.

Moreover, since many support devices 204 and 206 now come equipped with wireless signaling capability, even support devices 204 and 206 can use wireless protocols to establish communication with the support interfaces 212 of the docking station 202 and, hence, various client devices. For instance, a user could execute a bump 264 between a wireless-capable support device 204 and/or 206 causing interface switch 216 to operatively couple the corresponding support interface to one or more client devices. In such manners, support devices 204 and 206 can be added to system 200 by using a wireless protocol such as an NFC bump 264 and/or wireless signals 268.

Exemplary Processes

Figure 3:
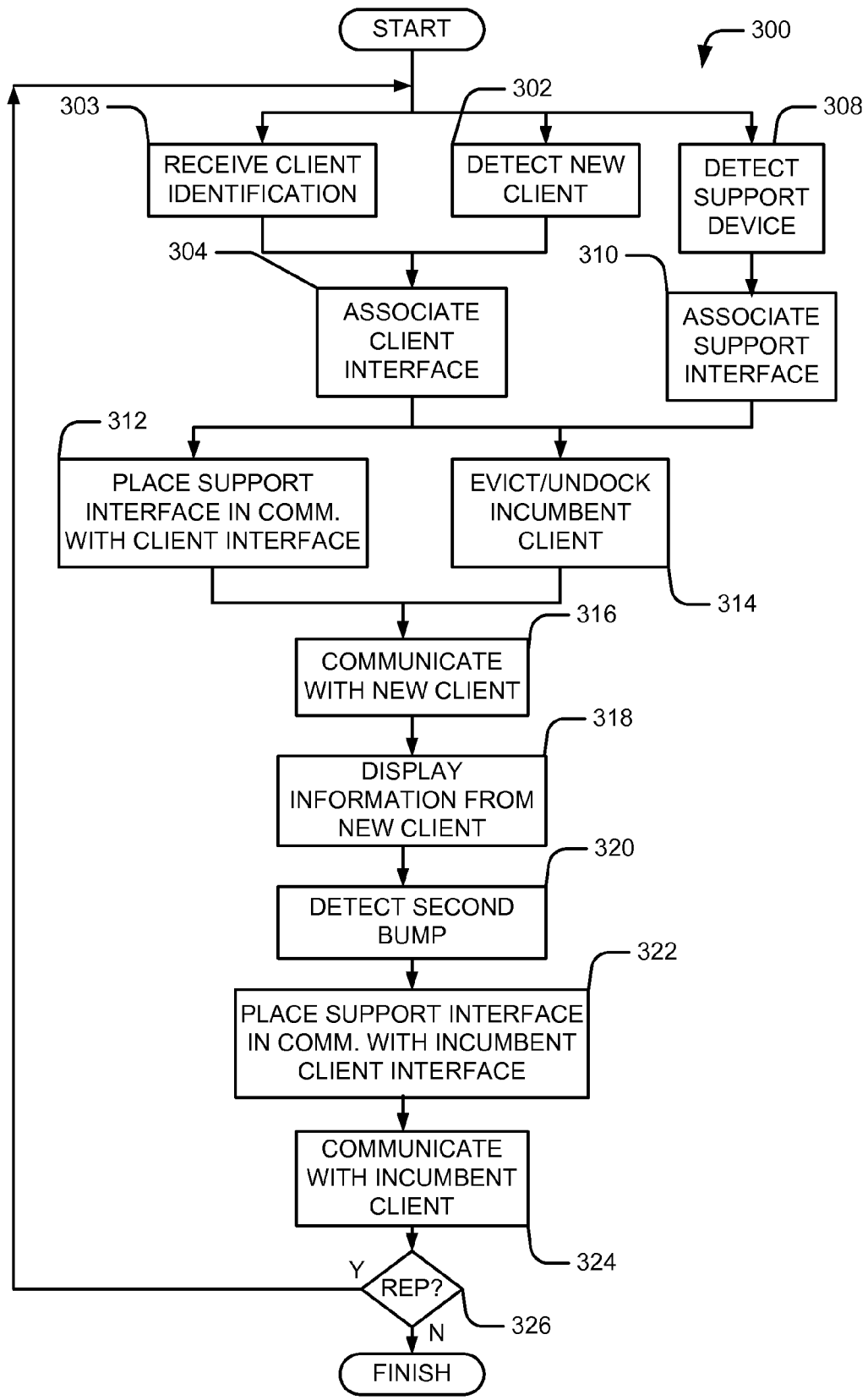
FIG. 3 is a flowchart illustrating an example process for docking clients to a docking station.

FIG. 3 is a flow diagram illustrating example process 300 implementing the techniques described herein for (un)docking clients and supporting devices. More particularly, FIG. 3 is a flowchart illustrating an example process for docking clients to a docking station.

As shown in FIG. 3, process 300 can begin with operation 302, wherein docking station 202 detects a new client device. For instance, one of the client interfaces 214 might sense an NFC bump and communicate that event to the interface switch 216 (and/or processor 218). Process 300 of the current embodiment can continue with the interface switch associating one of the available client interfaces 214 with the newly detected client or the interface switch 216 could preempt the client interface 214A currently associated with an incumbent client and associate it with the new client. See reference 304. If desired, the new client could at some point transmit to the docking station 202 an indication of its identity. See reference 303. In the alternative, or in addition, the docking station 202 could assign some unique and/or arbitrary identifier to the newly detected client so that operations, configurations, etc. that might usefully be associated therewith can be tracked, stored, re-used, etc.

Furthermore, it might be the case that one or more newly detected support devices 204 and/or 206 might appear in system 200. If such events occur, process 300 includes the docking station 202 of the current embodiment detecting these newly added support devices 204 and/or 206. See reference 308. Reference 310, furthermore, illustrates that process 300 can include associating support interfaces 212 with the newly added support devices 204 and/or 206. At some point, therefore, process 300 can include operatively connecting one or more support devices 204 and 206 and one or more client devices to the docking station 202.

For newly added client devices (or those which previously left system 200 and now appear to be re-entering it) process 300 can include placing one or more of the support devices 204 and 206 in communication therewith via the support interfaces 212, interface switch 216, and the appropriate client interfaces 214. See reference 312. Also, if desired, process 300 can disassociate the client interface 214A that had been servicing an incumbent client. For instance, if all of the client interfaces 214 are in use (prior to the detection of the new client), interface switch 216 can appropriate that client interface 214A and change its association to that of the new client. Thus, in some scenarios (as indicated by reference 314) an incumbent client can be evicted from or undocked from its previously associated client interface 214A (and therefore from docking station 202) responsive to the detection of a new client.

At some point, the docking station 202 can begin communicating with the newly added client via the appropriate client interface 214. For instance, docking station 202 could send a test message to the newly added client and verify that the client executes a handshaking function as indicated at reference 316. Once communications are established, the newly added client can begin transcieving messages with the support devices 204 and/or 206. For instance, as is often the case, a user might wish to display information stored on the newly added client on display 206. See reference 318.

Moreover, at some point, the docking station 202 might sense that another wireless protocol event associated with the newly added client has occurred. For instance, a user might have bumped the newly added client with the docking station 202 for a second time as indicated at reference 320. Depending on the embodiment, the second such event can indicate to the docking station 202 that the user wishes to remove the recently added client from system 200 and to restore support for the formerly incumbent client device. If so, process 300 includes operatively switching the communications paths through interface switch 216 so that the client interface 214A associated with the formerly incumbent device is placed back in communication with the support interfaces 212. Of course, if desired, that client interface 214 can be re-associated with the previously incumbent client. See reference 322.

Thereupon, docking station 202 can re-establish or verify communications with the re-introduced incumbent client. For instance, docking station 202 and the incumbent client device might execute a handshake via the appropriate client interface 214. See reference 324. Then, as indicated by reference 324, docking station 202 can either finish process 300 or repeat all or a portion thereof.

Figure 4:
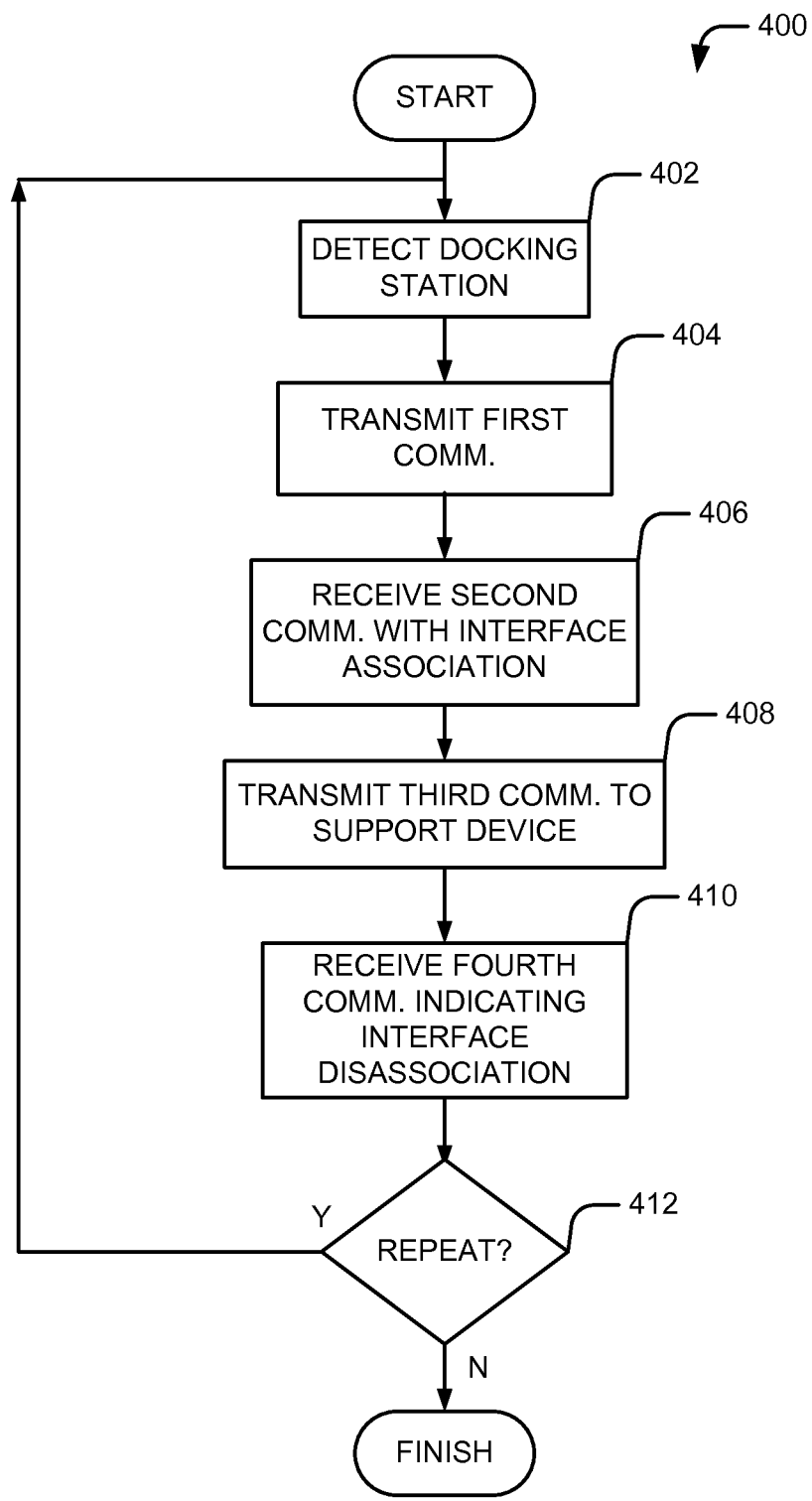
FIG. 4 is a flowchart illustrating another example process for docking clients to a docking station.

FIG. 4 is a flowchart illustrating another example process for docking clients to a docking station. More specifically, in some cases users might desire for newly added clients to execute handshakes with docking stations 202 of various embodiments. Thus, method 400 can begin with a client device detecting a docking station 202 for instance by sensing a bump between the device itself and the docking station 202. See reference 402. The client device can transmit a signal to the docking station that initiates a handshake and/or identifies the client to the docking station. See reference 404.

In return, the docking station can respond with a handshake confirmation message. In some embodiments, that communication could simply acknowledge the first communication from the client device and/or the communication from the docking station (and received by the client) could indicate which client interface 214 has been associated with the client. See reference 406.

At some time, it might be desirable for the newly added client to communicate with one or more of the support devices 204 and/or 206. For instance, a user might wish to print a picture stored on a cellular telephone 210 or receive a scanned image from display 206. In either case, communications between the newly added client and the support devices can commence via the appropriate client interfaces 214, interface switch 216, and support interface 212. See reference 408.

However, at some point, the user might wish to remove the newly added client from the system 200 and/or restore the previously incumbent device to the system 200. In such cases, the user might again initiate a wireless protocol indicating such a desire to the newly added client and/or the docking station 202. For instance, the user could again bump these clients together in accordance with appropriate NFC or other wireless protocols. For instance one protocol among many others included in the scope of the current disclosure is colloquially referred to as "wireless fidelity" (Wi-Fi) and is defined by the Institute of Electrical and Electronics Engineers (IEEE) 802.11 standard, std. 802.11 published 1997, its subsequent amendments and the like.

In some cases, the second bump itself could serve to notify the now removed client device that it has been removed from system 200 or that communications with docking station 202 have otherwise been terminated. Or, docking station 202 could send a pertinent communication indicating that further communications will not be supported at least until the now undocked client re-enters the system 200. See reference 410.

However, should the user wish to restore support to the now removed client, another bump (or other event) could indicate to the client device that re-establishment of communications is desired. In such situations, process 400 could repeat. In the alternative, process 400 could terminate as indicated at reference 412.

Thus, embodiments provide docking stations, which include at least two client interfaces and an interface for a support device. Docking stations of the current embodiment also include a proximity detector with a near field communications compatible antenna and a switch operatively coupled with the antenna. The proximity detector detects a first bump of a client and the docking station via the antenna and, in response, associates the first client interface with the detected client. The switch also causes the support interface to communicate with the first client interface instead of the second client interface.

In some embodiments, the docking station detects a second bump of the detected client device and, in response, switches communications with the support interface from the first client interface to the second client interface.

Various embodiments provide docking stations, which include first and second client interfaces and a support interface to be associated with, respectively, first and second clients and a support device. Docking stations of the current embodiment also include proximity detectors, which are configured to detect the proximity of at least one of the clients. In response, the docking stations associate the first client interface with the detected client and place the support interface in communication with the first client interface.

Thus, should a second client interface already be associated with another client and the support interface is in communication with the second client interface, the docking station removes the support interface from communication with the second client interface. However, if the docking station detects a second bump of the first client, the docking station can place the support interface in communication with the second client interface again. In addition, or in the alternative, the docking station can detect the proximity of a support device and associate the support interface with the support device. For instance, the support device could be a display or the docking device could be a display itself (in which case the support interface could be internal to the display).

The interfaces of the current embodiment can be wireless interfaces. Moreover, the proximity detector can include a radio frequency antenna with a resonant frequency of about 6.78 MHz, about 13.56 MHz, about 2.4 GHz, about 5 GHz, and about 60 GHz (which are associated with NFC, wireless power transfer (WPT), and Wi-Fi related protocols). In this context, "about" indicates that the proximate frequencies may be used if a tuner seeking such frequencies effectively delivers the signal. Moreover, the detection of the client can be by way of a bump between the detected client and the docking station. For instance, in some embodiments, the proximity detector includes a near field communications compatible antenna and a switch operatively coupled to the near field communications compatible antenna and the client interfaces.

Embodiments also provide methods of docking clients. A method of some embodiments includes detecting the proximity of a first client with a docking device. The method also includes associating a first client interface (or a plurality of client interfaces) of the docking device with the detected first client. Furthermore, the method of the current embodiment includes placing a support interface of the docking device in communication with the first client interface such that, for instance, information from the client device can be displayed on a display. Indeed, the method of the current embodiment can also include detecting the proximity of a support device and associating the support interface with the detected support device.

Note that the detection of the client device can be way of a bump of the client device and the docking station using, if desired, a near field communications related protocol. Moreover, a second bump of the client device can cause the docking device to place the support interface in communication with the second client interface thereby allowing communications between the support device and a second client associated with the second client interface. For instance, the method could include receiving an indication of the identity of the detected first client (or other information) and displaying that identity (or other information) on a display associated with the support interface. Moreover, embodiments provide computer readable media, which store machine-readable instructions which when executed by a machine cause the machine to execute methods such as the foregoing.

Further still, embodiments provide client devices, which include housings, antennas, processors, and memories. The processors and memories of the current embodiment are in the housings and in communication with each other. Furthermore, the memory stores machine-readable instructions which when executed by the processor cause the processor to detect the proximity of a docking device via the antenna. The instructions also cause the processor to transmit at least a first communication to the docking device and receive from the docking device a second communication indicating that that the docking device has associated a first of at least two client interfaces with the client device. The instructions also cause the processor to transmit a third communication to a support device via the first client interface. In some embodiments, the antenna is a near field communications compatible antenna with a resonant frequency of about 6.78 MHz, about 13.56 MHz, or about 60 GHz. Moreover, the client device can detect the docking device via a bump between the client device and the docking device. In addition, or in the alternative, another bump can cause the client device to receive a fourth communication from the docking device indicating that the docking device has disassociated the first client interface and the client device.

One or more implementations involve the use of laptops, docketing stations, and mobile phones. Other implementations may use desktop, stand-alone computers, stationary computers, servers, tablet computers, smart phones, and other computing devices.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

What is claimed is:

1. A docking station comprising:
   a first client interface to be associated with a first client, the first client interface being a near field communications interface;
   a second client interface to be associated with a second client;
   a support interface to be associated with a support device;
   a proximity detector further comprising a near field communications compatible antenna and a switch operatively coupled with the near field communications compatible antenna, the proximity detector being configured to detect a first bump of a client and the docking station via the near field communications antenna and, responsive to the first bump, to associate the first client interface with the detected client and to switch the support interface to communicating with the first client interface from communicating with the second client interface via the switch.

2. The docking station as recited in claim 1, wherein the proximity detector is further configured to detect a second bump of the detected device and, responsive to the second bump of the detected device, to switch the support interface to being in communication with the second client interface from being in communication with the first client interface via the switch.

3. A docking station comprising:
a first client interface to be associated with a first client;
a second client interface to be associated with a second client;
a support interface to be associated with a support device;
a proximity detector configured to detect the proximity of at least one of the clients and, responsive to the detection of a client, to associate the first client interface with the detected client and to place the support interface in communication with the first client interface.

4. The docking station as recited in claim 3, wherein the interfaces includes wireless interfaces.

5. The docking station as recited in claim 3, wherein the proximity detector includes a radio frequency antenna with a resonant frequency selected from the group consisting of about 6.78 MHz, about 13.56 MHz, about 2.4 GHz, about 5 GHz, and about 60 GHz.

6. The docking station as recited in claim 5, wherein the proximity detector is further configured to detect the detected client by detecting a first bump between the detected client and the docking station.

7. The docking station as recited in claim 6, wherein the proximity detector is further configured to detect a second bump of the detected client and, responsive to the second bump of the detected client, to place the support interface in communication with the second client interface.

8. The docking station as recited in claim 3, wherein the docking station is a portion of a display device.

9. The docking station as recited in claim 3, wherein before the detection of the detected device, the second client interface is associated with a client and the support interface is in communication with the second client interface, the proximity detector is further configured to, responsive to the detection of the detected client, to remove the support interface from communication with the second client interface.

10. The docking station as recited in claim 3, wherein the proximity detector includes a near field communications compatible antenna and a switch operatively coupled to the near field communications compatible antenna and the client interfaces.

11. The docking station as recited in claim 3, wherein the proximity detector is further configured to detect a proximity of a support device and, responsive to the detected support device, to associate the support interface with the support device.

12. A process of docking clients comprising:
detecting a proximity of a first client with a docking device;
associating a first client interface of the docking device with the detected first client wherein the docking device further comprises a second client interface; and
placing a support interface of the docking device in communication with the first client interface.

13. The process as recited in claim 12 further comprising communicating with the detected first client via the first client interface at a frequency selected from the group consisting of about 6.78 MHz, about 3.56 MHz, about 2.4 GHz, about 5 GHz, and about 60 GHz.

14. The process as recited in claim 12, wherein the detecting the proximity of the first client further comprises detecting a first bump between the first client and the docking device.

15. The process as recited in claim 14, further comprising detecting a second bump between the first client and the docking device and, responsive to the second bump, placing the support interface of the docking device in communication with the second client interface.

16. The process as recited in claim 15 further comprising, further responsive to the second bump, communicating with a second client already associated with the second client interface via the second client interface.

17. The process as recited in claim 12 further comprising displaying information received from the detected first client via the first client interface on a display associated with the support interface.

18. The process as recited in claim 12, wherein the detecting the proximity of the first client with the docking device further comprises using a near field communications-related protocol.

19. The process as recited in claim 12 further comprising detecting a proximity of a support device with the docking device and, responsive to the detecting of the support device, associating the support interface with the detected support device.

20. The process as recited in claim 12 further comprising receiving an indication of an identity of the detected first client.

21. The process as recited in claim 20, further comprising displaying the identity of the detected first client on a display associated with the support interface.

22. One or more non-transitory computer-readable media storing instructions which when executed by a machine cause the machine to perform a process comprising:
detecting a proximity of a first client with a docking device;
associating a first client interface of the docking device with the detected first client wherein the docking device further comprises a second client interface; and
placing a support interface of the docking device in communication with the first client interface.

23. One or more non-transitory computer-readable media as recited in claim 22, wherein the detecting the proximity of the first client further comprises detecting a first bump between the first client and the docking device.

24. One or more non-transitory computer-readable media as recited in claim 23, wherein the medium stores further instructions which when executed by the machine cause the machine to detect a second bump between the first client and the docking device and, responsive to the second bump, place the support interface of the docking device in communication with the second client interface.

25. One or more non-transitory computer-readable media as recited in claim 24, wherein the medium stores further instructions which when executed by the machine cause the machine to, further responsive to the second bump, communicate with a second client already associated with the second client interface.

26. One or more non-transitory computer-readable media as recited in claim 22 wherein the medium stores further machine-readable instructions which when executed by the machine cause the machine to detect a proximity of a support device with the docking device and, responsive to the detecting of the support device, associate the support interface with the detected support device.

27. One or more non-transitory computer-readable media as recited in claim 22 wherein the medium stores further machine-readable instructions which when execute by the machine cause the machine to receive an indication of the detected first client.

28. One or more non-transitory computer-readable media as recited in claim 27, wherein the medium stores further machine-readable instructions which when executed by the machine cause the machine to display the identity of the detected first client on a display associated with the support interface.

29. A client device comprising:
- a housing;
- an antenna;
- a processor in the housing and in communication with the antenna; and
- a memory in the housing and in communication with the processor, the memory storing machine-readable instructions which when executed by the processor cause the processor to:
- detect the proximity of a docking device via the antenna;
- transmit at least a first communication to the docking device; and
- receive from the docking device a second communication indicating that that the docking device has associated a first of at least two client interfaces of the docking device with the client device; and
- transmit a third communication to a support device via the first client interface of the docking device and associated with the client device.

30. The client device as recited in claim 29, wherein the antenna is a near field communications compatible antenna.

* * * * *